J. H. TIBBITS.
Horse-Hampers.
No. 146,722.
Patented Jan. 20, 1874.
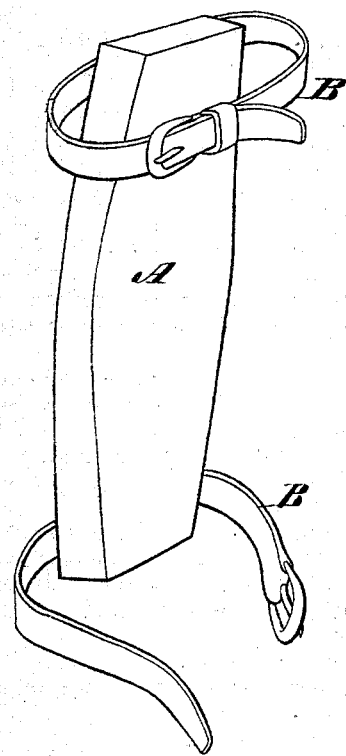
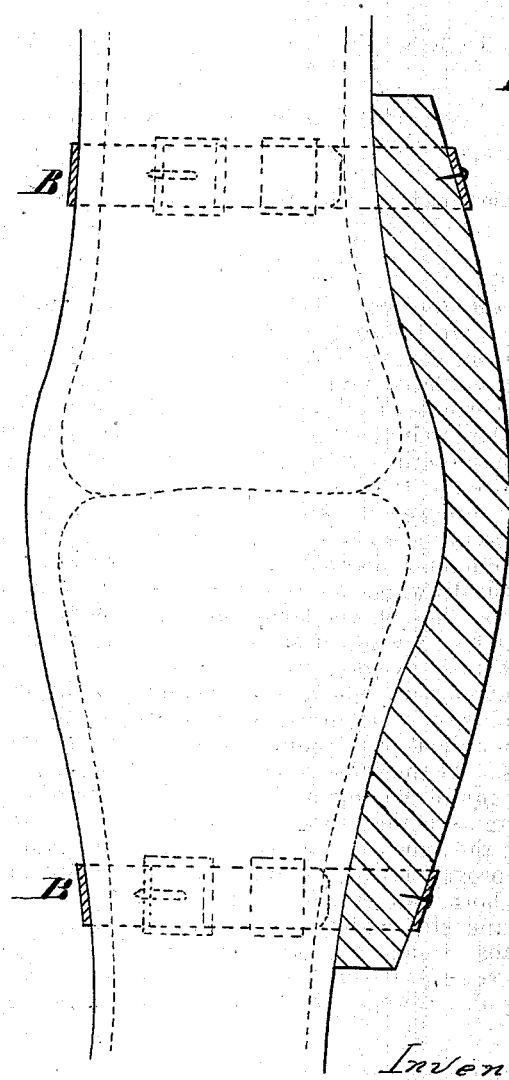

UNITED STATES PATENT OFFICE.

JASON H. TIBBITS, OF WINNECONNE, WISCONSIN.

IMPROVEMENT IN HORSE-HAMPERS.

Specification forming part of Letters Patent No. 146,722, dated January 20, 1874; application filed October 4, 1873.

*To all whom it may concern:*

Be it known that I, JASON H. TIBBITS, of Winneconne, in the county of Winnebago and State of Wisconsin, have invented a new and valuable Improvement in Horse-Hampers; and I do hereby declare that the following is a full, clear, and exact description of the construction and operation of the same, reference being had to the annexed drawings making a part of this specification, and to the letters and figures of reference marked thereon.

Figure 1 of the drawings is a representation of a perspective view of my horse-hamper. Fig. 2 is a sectional view of the same.

The object of this invention is to provide a simple and cheap device, which is applicable to the leg of a horse or other animal, and which will prevent an animal from running away or jumping fences. At the same time it will not in any manner injure the animal.

The following is a description of my improvement: In the annexed drawings, A represents my improved hamper, which may be made of wood, horn, hard rubber, or any other suitably hard and stiff material. B B represent two straps, which are provided with buckles, and are of sufficient length to pass around the leg of an animal above and below the knee. These straps are permanently secured to the hamper A by means of nails or other suitable fastening. The inner surface, or that surface of the hamper which is applied next the knee, is concave, so that it will conform to the shape of the knee, and, if desired, this concave surface may be covered with some soft material, which will be comfortable to the animal.

It is not necessary to strap the hamper on the knee so tight as to prevent all motion thereof, as it is intended that the animal shall be free to walk and to lie down and get up.

What I claim as new, and desire to secure by Letters Patent, is—

The animal-hamper A, constructed of hard and stiff material, having its inner surface concave to conform to the shape of the knee, and provided with the buckle-straps B, as shown and described.

In testimony that I claim the above, I have hereunto subscribed my name in the presence of two witnesses:

JASON HENRY TIBBITS.

Witnesses:
THOMAS A. CLARK,
I. H. BOYLE.